(12) United States Patent
Kunz et al.

(10) Patent No.: US 9,903,236 B2
(45) Date of Patent: Feb. 27, 2018

(54) ADJUSTABLE CAMSHAFT

(71) Applicant: THYSSENKRUPP PRESTA TECCENTER AG, Eschen (LI)

(72) Inventors: Michael Kunz, Chemnitz (DE); Uwe Dietel, Lichtentanne (DE); Jürgen Meusel, Dittmannsdorf (DE)

(73) Assignee: THYSSENKRUPP PRESTA TECCENTER AG, Eschen (LI)

( * ) Notice: Subject to any disclaimer, the term of this patent is extended or adjusted under 35 U.S.C. 154(b) by 0 days.

(21) Appl. No.: 14/900,734

(22) PCT Filed: Jun. 24, 2014

(86) PCT No.: PCT/EP2014/001711
§ 371 (c)(1),
(2) Date: Dec. 22, 2015

(87) PCT Pub. No.: WO2014/206553
PCT Pub. Date: Dec. 31, 2014

(65) Prior Publication Data
US 2016/0138440 A1  May 19, 2016

(30) Foreign Application Priority Data

Jun. 27, 2013  (DE) .................. 10 2013 106 747

(51) Int. Cl.
*F01L 1/344* (2006.01)
*F01L 1/047* (2006.01)
*F16H 53/04* (2006.01)

(52) U.S. Cl.
CPC ............... *F01L 1/344* (2013.01); *F01L 1/047* (2013.01); *F16H 53/04* (2013.01);
(Continued)

(58) Field of Classification Search
CPC ............... F01L 1/047; F01L 2001/0471; F01L 2001/0473; F01L 1/344; F01L 2101/00; F01L 2103/00; F16H 53/04
(Continued)

(56) References Cited

U.S. PATENT DOCUMENTS 4,771,742 A * 9/1988 Nelson ...................... F01L 1/08
123/90.15
6,308,677 B1 * 10/2001 Bohach ................... F01L 7/021
123/190.1
(Continued)

FOREIGN PATENT DOCUMENTS

CN  1942657 A  4/2007
CN  102046930 A  5/2011
(Continued)

OTHER PUBLICATIONS

German Language International Search Report for International patent application No. PCT/EP2014/001711; dated Sep. 5, 2014.
(Continued)

*Primary Examiner* — Phutthiwat Wongwian
*Assistant Examiner* — Loren Edwards
(74) *Attorney, Agent, or Firm* — thyssenkrupp North America, Inc.

(57) ABSTRACT

An adjustable camshaft can be used in a valve drive of an internal combustion engine. The adjustable camshaft may include an inner shaft rotatably supported by and concentric with an outer shaft. A cam element may be rotatably supported on the outer shaft such that the outer shaft extends through a cam bore of the cam element. The cam element may be rotatably-fixed to the inner shaft, in some cases, by way of a bolt. Further, a bearing sleeve that is rotatably-fixed to the cam element may be inserted within the cam bore such that a slide bearing gap is formed between the bearing sleeve
(Continued)

and the outer shaft. Furthermore, in some examples the cam element may be a collared cam that has a cam base body and a cam collar adjacent to one another.

14 Claims, 3 Drawing Sheets

(52) U.S. Cl.
CPC ... *F01L 2001/0473* (2013.01); *F01L 2101/00* (2013.01); *F01L 2103/00* (2013.01)

(58) Field of Classification Search
USPC .............................. 123/90.15, 90.17, 90.16
See application file for complete search history.

(56) References Cited

U.S. PATENT DOCUMENTS

| | | | | |
|---|---|---|---|---|
| 7,610,890 | B2* | 11/2009 | Lettmann | F01L 1/047 123/90.44 |
| 8,322,318 | B2* | 12/2012 | David | F01L 1/352 123/90.15 |
| 8,495,980 | B2* | 7/2013 | Scherzinger | F01L 1/047 123/90.17 |
| 2007/0240657 | A1 | 10/2007 | Schneider | |
| 2008/0257290 | A1 | 10/2008 | Lettmann et al. | |
| 2009/0229550 | A1 | 9/2009 | Clever et al. | |
| 2011/0120401 | A1 | 5/2011 | Scherzinger | |
| 2012/0160197 | A1 | 6/2012 | Matsunaga | |
| 2014/0238184 | A1 | 8/2014 | Kunz | |

FOREIGN PATENT DOCUMENTS

| | | |
|---|---|---|
| CN | 102713169 A | 10/2012 |
| DE | 10 2007 016 977 A1 | 10/2008 |
| DE | 10 2009 012 143 A1 | 10/2009 |
| WO | 2013024140 A | 2/2013 |

OTHER PUBLICATIONS

English translation of International Search Report for International patent application No. PCT/EP2014/001711; dated Sep. 5, 2014.
English translation of the abstract of DE 10 2007 016 977 A1.

* cited by examiner

Detail I

Detail II

Detail III

ADJUSTABLE CAMSHAFT

CROSS REFERENCE TO RELATED APPLICATIONS

This application is a U.S. National Stage Entry of International Patent Application Serial Number PCT/EP2014/001711, filed Jun. 24, 2014, which claims priority to German Patent Application No. DE 102013106747.6 filed Jun. 27, 2013, the entire contents all of which are incorporated herein by reference.

FIELD

The present disclosure relates to adjustable camshafts and, more particularly, to adjustable camshafts for valve drives of internal combustion engines.

BACKGROUND

Adjustable camshafts for valve trains of internal combustion engines, with cam elements adjustable in their phase position relative to each other, allow the control of inlet valves and exhaust valves of the internal combustion engine with different timings, without the need for an inlet camshaft for the inlet valves and a separate exhaust camshaft for the exhaust valves. The shafts mounted in each other rotate about a common rotation axis in the cylinder head and can be adjusted in their relative phase position via a control element. The cam elements are held rotatably on the outside of the outer shaft, forming a slide bearing gap. Via a bolt, the cam elements are connected rotationally fixedly to the inner shaft, and to pass the bolts through the outer shaft, the outer shaft has corresponding bolt openings formed linearly in the peripheral direction.

For example, DE 10 2009 012 143 A1 discloses an adjustable camshaft for the valve drive of an internal combustion engine, with an outer shaft and an inner shaft running concentrically and held rotatably in the outer shaft. Bearing sleeves are pressed onto the outside of the outer shaft and serve to hold the cam elements rotatably, and at the same time ensure the rotatable bearing of the camshaft in the cylinder head. For this, the bearing sleeves have a corresponding length and must be pushed onto the outside of the outer shaft. To arrange the cam elements on the bearing sleeves, these must first be extensively reworked, in particular to remove machining residue from the outer face of the bearing sleeves. The bearing sleeves are configured substantially wider for the common mounting of the cam elements on the bearing sleeves and for mounting the camshaft in the cylinder head, and the bearing sleeves must be machined over a great axial length. Furthermore, the disadvantage results that the bearing sleeves entail an increase in the slide bearing diameter on which the cam elements are mounted rotatably on the outside of the camshaft, unnecessarily increasing the friction occurring in the slide bearing arrangement.

DETAILED DESCRIPTION

Figure 1:
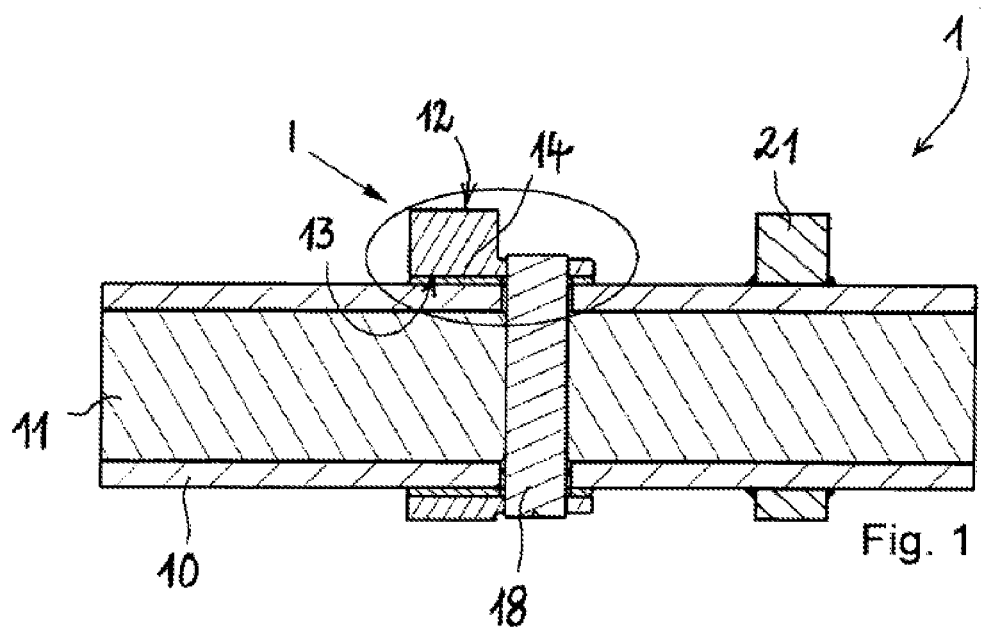
FIG. 1 is a cross-sectional view of an example camshaft.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The object of the invention is to improve the bearing arrangement of cam elements on the outer shaft of an adjustable camshaft. In particular, the object of the present invention is to provide an adjustable camshaft with a simplified construction and simplified installation. Finally, there is the object of minimizing the resulting friction in the bearing arrangement of the cam elements on the outer shaft of the adjustable camshaft.

The present invention concerns an adjustable camshaft for the valve drive of an internal combustion engine. In some examples, the adjustable camshaft may have an outer shaft and an inner shaft running concentrically and held rotatably in the output shaft, wherein at least one cam element with a cam bore is mounted rotatably on the outer shaft, and wherein the cam element is connected rotationally fixedly to the inner shaft.

The invention includes the technical teaching that a bearing sleeve is inserted in the cam bore and is connected rotationally fixedly to the cam element, so that a slide bearing gap is formed between the bearing sleeve and the outer shaft.

The invention advantageously uses the possibility of inserting a bearing sleeve in the cam bore of the cam element in a rotationally fixed manner, so as to allow the slide bearing pairing between the inner surface of the bearing sleeve and the outer surface of the outer shaft. In this way, the action radius of the slide bearing is reduced; also mounting of the adjustable camshaft is facilitated since there is no need first to apply bearing sleeves onto the outer shaft of the adjustable camshaft, in order then to place the cam elements on the bearing sleeves.

A particular advantage arises from the fact that the configuration of the bearing sleeves in the cam elements, in particular with regard to an advantageous material selection, may be adapted to the specific loading of the slide bearing of the cam elements on the outer shaft. According to the embodiment of the invention, the bearing sleeves do not serve simultaneously to mount the camshaft in the cylinder head—which bearing must withstand higher loads—but merely to mount the cam elements on the outer shaft. Due to the smaller action radius of the slide bearing arrangement between the inside of the bearing sleeve and the outside of the outer shaft, the friction of the bearing of the cam elements on the outer shaft is also reduced.

Particularly advantageously, the bearing sleeve can be pressed into the cam bore. The friction connection thus formed allows the bearing sleeve to be connected rotationally fixedly to the cam element, so as to securely prevent a twist of the bearing sleeve in the cam bore. Also, the bearing sleeve may be pinned in the cam bore to create a form-fit connection between the bearing sleeve and the cam element.

Further advantageously, the bearing sleeve may have an axial length with which it extends over the entire width of the cam element. Thus the bearing sleeve may be adapted to the width of the cam element, in particular to form a slide bearing gap with an axial length corresponding to the width of the cam element. The width of the cam element is determined in particular by the length of the cam bore through which the outer shaft is guided.

The cam element may be formed as a collared cam element with a cam base body and a cam collar, wherein the bearing sleeve may have an axial length with which it extends beyond the width of the cam base body and cam collar.

According to a further possible embodiment for forming a slide bearing, the cam element may be configured as a collared cam element and the bearing sleeve may have an axial length with which it extends only over the width of the cam base body. Consequently, the bearing sleeve may be introduced into the cam bore only over a part portion thereof which lies below the actual cam element, in particular since active forces of the cam element are only transferred to the cam base body via the cam element, since contact with a take-off element, for example a rocker lever or valve, is restricted to the axial width of the cam base body. The cam collar here serves preferably for rotationally fixed connection of the cam element to the inner shaft.

According to a further embodiment of the bearing arrangement, the cam bore may have a radial shoulder which is formed between a first inner diameter region with a larger diameter for receiving the bearing sleeve and a second inner diameter region of the cam collar with a smaller diameter. The bearing sleeve may be pressed in over the axial width of the larger inner diameter until the axial face of the bearing sleeve comes to rest against the radial shoulder.

A bolt may be provided for connecting the cam element to the inner shaft in a rotationally fixed manner, and extends transversely through the inner shaft and through at least one bolt opening made in the outer shaft. The bolt may be held by at least one of its ends in the cam element, whereby the rotationally rigid connection of the cam element with the inner shaft is created by the bolt. If the bearing sleeve also extends over the region in which the bolt is inserted, at least one radial passage opening may be formed in the bearing sleeve through which the bolt extends. In particular if the bolt is inserted in the region of the cam collar and the bearing sleeve also extends through the cam collar, radial passage openings may be made in the bearing sleeve, which in addition to the friction connection from pressing the bearing sleeve into the cam bore, secures the bearing sleeve axially by a form-fit connection.

According to a further advantageous embodiment of the bearing of the cam element on the outer shaft, the bearing sleeve may be made of a bronze material, a brass material or alloys of bronze and brass. Alternatively, the bearing sleeve may comprise a plastic material. The plastic material may for example be a polyoxymethylene (POM) or for example a polyimide (PI). Further advantageously, the inner bearing surface of the bearing sleeve may have a coating which for example comprises a polytetrafluoroethylene coating (PTFE). In particular, the use of PTFE coatings in the bearing sleeve leads to advantageous emergency running properties on deficient lubrication.

According to a further advantageous embodiment of the bearing sleeve, the inner bearing surface may be designed smooth or preferably have a structured bearing surface, which in particular comprises cup-like or groove-like recesses which may form a lubricant reservoir. The structured surface may for example be produced by a laser machining process, a honing process, an electron beam process or by etching processes.

Figure 1A:
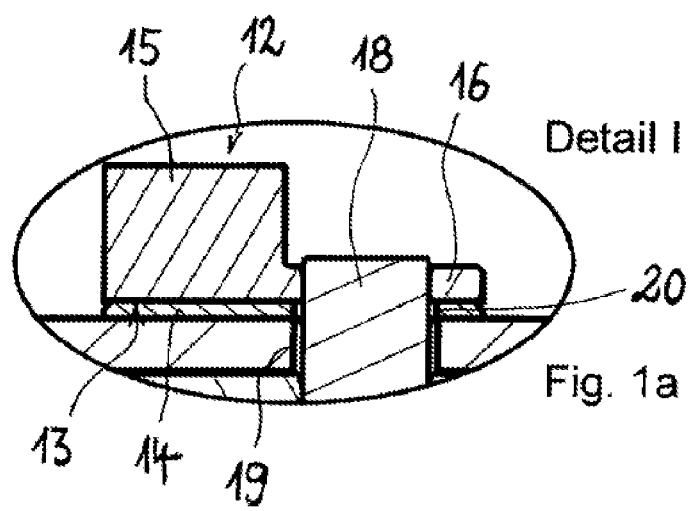
FIG. 1a is an enlarged view of the example camshaft of FIG. 1.

FIGS. 1 and 1a show in a cross-section view a first exemplary embodiment of a camshaft 1, wherein FIG. 1a shows the detail I according to FIG. 1. The camshaft 1 is configured as an adjustable camshaft 1 and serves for the valve drive of an internal combustion engine, wherein the inlet valves and exhaust valves can be driven via a common camshaft 1 with variable cam timings. The camshaft 1 comprises an outer shaft 10 through which an inner shaft 11 extends, and the inner shaft 11 is held rotatably in the outer shaft 10. On the outside, a cam element 12 is held rotatably on the outer shaft 10 and a further cam element 21 is shown in a fixed arrangement on the outer shaft 10. The cam element 12 is connected to the inner shaft 11 via a bolt 18, and the bolt 18 extends transversely through the inner shaft 11 and is held at the end in the cam element 12. The bolt openings 19 shown for passage of the bolt 18 through the outer shaft 10 have a longitudinal extension in the peripheral direction, so that the inner shaft 11 can twist through a predefined angular range in the outer shaft 10, wherein this twist is also executed by the cam element 12 on the outside of the outer shaft 10. As a result, the phase position of the cam element 12 can be changed relative to the cam element 21.

To hold the cam element 12 on the outer shaft 10, the cam element 12 has a cam bore 13 through which the outer shaft 10 extends. According to the invention, a bearing sleeve 14 is inserted in the cam bore 13 so as to be rotationally fixed to the cam element 12, and the inside of the bearing sleeve 14 with the outside of the outer shaft 10 serves to form a slide bearing arrangement. According to the exemplary embodiment shown, the bearing sleeve 14 is pressed into the cam bore 13 so that it is inserted self-supportingly and hence rotationally fixedly in the cam bore 13. The bearing sleeve 14 comprises a material which is different from the material of the cam element 12, in particular the bearing sleeve 14 comprises a brass material, a bronze material or a plastic material, and the cam element 12 comprises a steel material.

As depicted in particular in detail I in FIG. 1a, the cam element 12 is formed as a collared cam element and has a cam base body 15 and a cam collar 16. The bolt 18 is held by its end in the cam collar 16 and extends both through the bolt opening 19 made in the outer shaft 10 and through the passage opening 20 made in the bearing sleeve 14. The axial length of the bearing sleeve 14 corresponds to the axial length of the cam element 12 having the cam base body 15 and cam collar 16.

Figure 2:
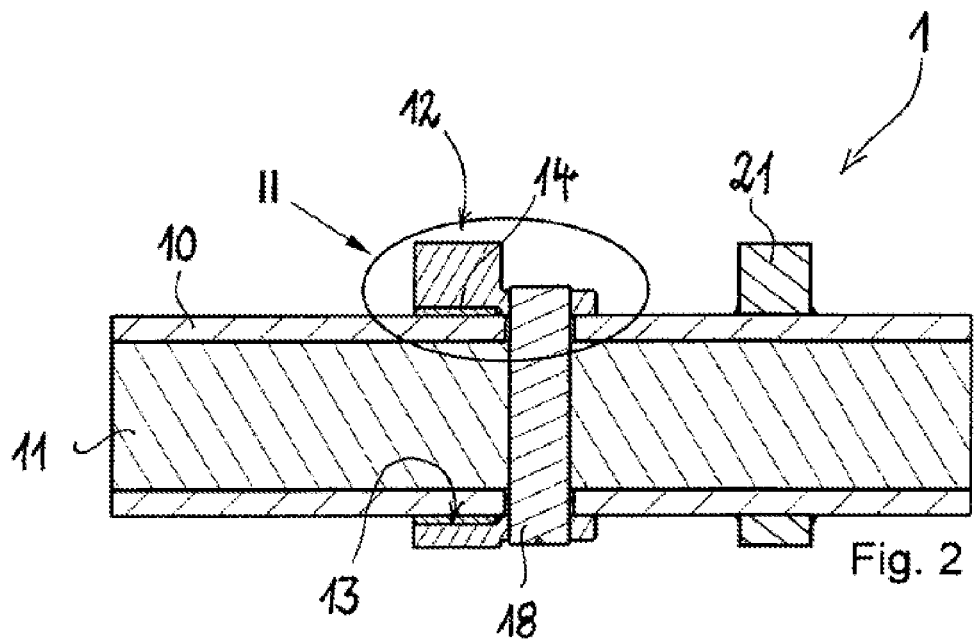
FIG. 2 is a cross-sectional view of an example camshaft wherein a bearing sleeve extends along only a portion of an example cam element.
Figure 2A:
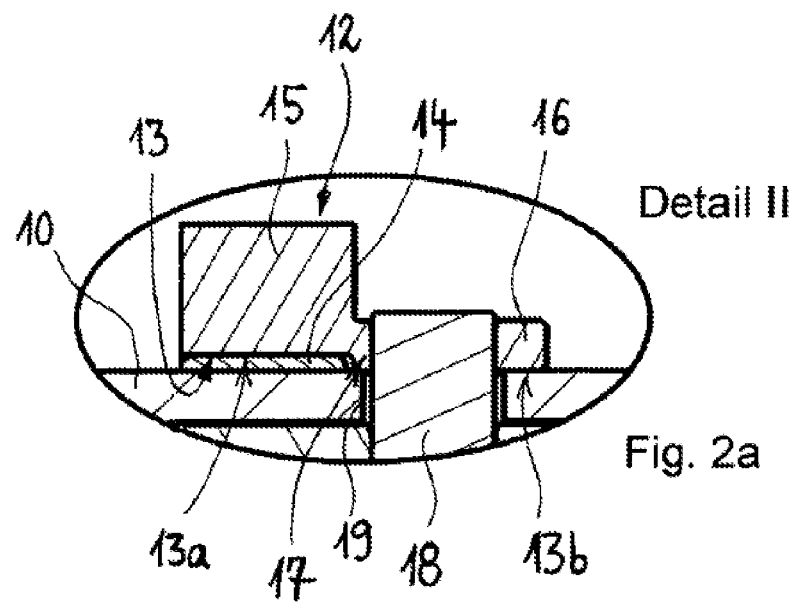
FIG. 2a is an enlarged view of the example camshaft of FIG. 2.

FIGS. 2 and 2a show a further exemplary embodiment of the camshaft 1 with an outer shaft 10 and an inner shaft 11, and a cam element 12 is connected to the inner shaft 11 rotationally fixedly via a bolt 18, wherein a further cam element 21 is rigidly connected to the outer shaft 10, as shown in FIG. 2a. A bearing sleeve 14 is inserted in the cam bore 13 of the cam element 12 and is held with the bearing sleeve 14 against the outside of the outer shaft 10, forming a slide bearing arrangement for rotatably holding the cam element 12 on the outer shaft 10. The cam element 12 is configured as a collared cam element with a cam base body 15 and a cam collar 16. According to the exemplary embodiment shown, the cam bore 13 has a first inner diameter region 13a which has a larger inner diameter, and the cam bore 13 has a second inner diameter region 13b with a smaller diameter. The first inner diameter region 13a extends over the axial width of the cam base body 15, and the second inner diameter region 13b extends over the axial width of the cam collar 16.

The first inner diameter region 13a with the larger diameter serves to hold the bearing sleeve 14, which has an axial length corresponding to the axial length of the first inner diameter region 13a. The transition from the first inner diameter region 13a to the second inner diameter region 13b forms a radial shoulder 17, against which the bearing sleeve 14 can come to rest axially when pressed into the cam bore 13.

The diameter of the second inner diameter region 13b corresponds approximately to the outer diameter of the outer shaft 10, wherein the radial gap between the second inner diameter region 13b and outer diameter of the outer shaft 10 may be configured such that there is no supporting action of the slide bearing arrangement in the region of the cam collar 16.

Figure 3:
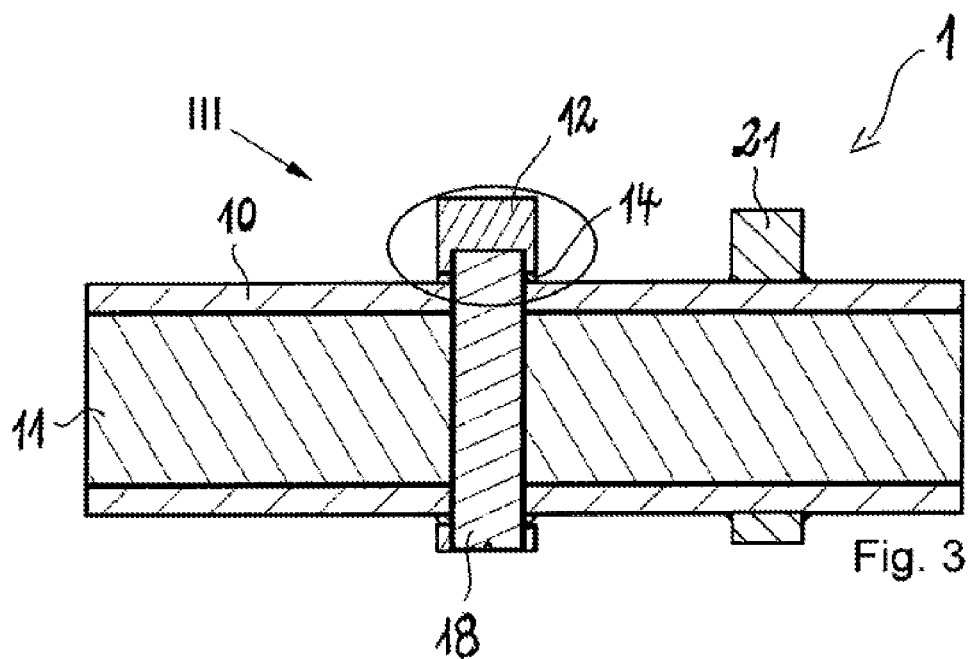
FIG. 3 is a cross-sectional view of an example camshaft without a cam collar.
Figure 3A:
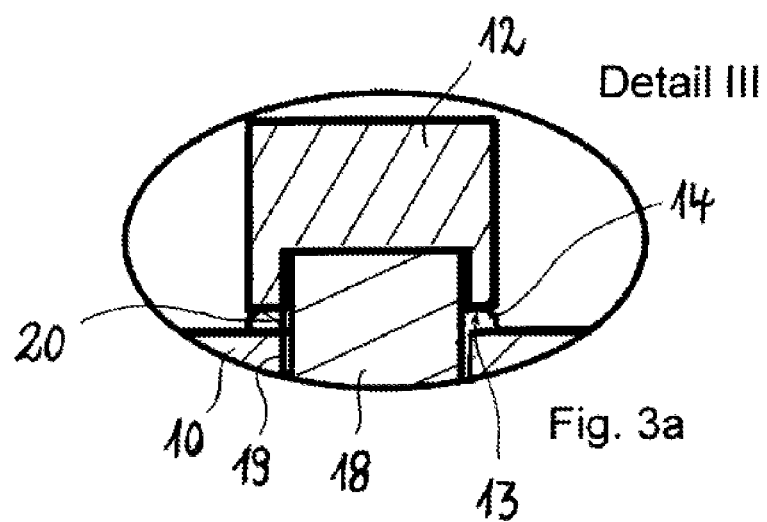
FIG. 3a is an enlarged view of the example camshaft of FIG. 3.

FIGS. 3 and 3a show a further exemplary embodiment of a camshaft 1 for the valve drive of an internal combustion engine, with an outer shaft 10 and an inner shaft 11 extending concentrically through the outer shaft 10, wherein a cam element 12 is shown which is held on the outer shaft 10 rotationally fixedly by a bolt 18 and rotatably by the inner shaft 11, as shown in enlargement in detail III of FIG. 3a. The further cam element 21 is rigidly held on the outer shaft 10 of the camshaft 1.

The cam element 12 has no cam collar, and a bearing sleeve 14, corresponding to the axial width of the cam element 12, is inserted in the cam bore 13 of the cam element 12. The bolt 18 extends both through the bolt opening 19 in the outer shaft 10 and through a passage opening 20 in the bearing sleeve 14, in order finally to sit with at least one end in the cam element 12. Because the bolt 18 is passed through the passage opening 20 in the bearing sleeve 14 or is pressed therein, the bearing sleeve 14 is advantageously connected captively with the cam element 12 and the bolt 18, and the form-fit connection formed between the bolt 18 and the passage opening 20, in addition to the friction connection between the outside of the bearing sleeve 14 and the cam bore 13, can prevent the bearing sleeve 14 from wandering laterally out of the cam element 12.

In its embodiment, the invention is not restricted to the preferred exemplary embodiments described above. Rather, a number of variants is conceivable which make use of the proposed solution even in fundamentally different embodiments. All features and/or advantages arising from the claims, the description or the drawings, including constructional details or spatial arrangements, may be essential to the invention both alone and in widely varying combinations.

What is claimed is:

1. An adjustable camshaft for a valve drive of an internal combustion engine, the adjustable camshaft comprising:
    an outer shaft;
    an inner shaft concentric with the outer shaft and rotatably supported in the outer shaft;
    at least one collared cam element with a cam bore rotatably supported on the outer shaft, wherein the at least one collared cam element is rotatably-fixed to the inner shaft, the at least one collared cam element including a cam base body and a cam collar adjacent to the cam base body; and
    a bearing sleeve rotatably-fixed to the at least one collared cam element, with the bearing sleeve inserted into the cam bore of the at least one collared cam element such that a slide bearing gap is formed between the bearing sleeve and the outer shaft.

2. The adjustable camshaft of claim 1 wherein the bearing sleeve is press fit into the cam bore.

3. The adjustable camshaft of claim 1 wherein the bearing sleeve is at least as long as the at least one collared cam element in an axial direction.

4. The adjustable camshaft of claim 1 wherein the bearing sleeve has an axial length that extends along the cam base body and the cam collar.

5. The adjustable camshaft of claim 1 wherein the bearing sleeve has an axial length that extends only along the cam base body of the at least one collared cam element.

6. The adjustable camshaft of claim 5 wherein the cam bore has a first inner diameter region extending along the cam base body and a second inner diameter region extending along the cam collar, with a first inner diameter of the first inner diameter region being larger than a second inner diameter of the second inner diameter region such that the first inner diameter region receives the bearing sleeve, wherein a radial shoulder is disposed between the first inner diameter region and the second inner diameter region.

7. The adjustable camshaft of claim 1 further comprising a bolt for rotatably fixing the at least one collared cam element to the inner shaft, the bolt extending transversely through the inner shaft and through at least one bolt opening in the outer shaft, wherein the bolt is positioned with at least one end in the at least one collared cam element, wherein the bearing sleeve has at least one radial passage opening through which the bolt extends.

8. The adjustable camshaft of claim 7 wherein the bolt is positioned with at least one end in the cam collar of the at least one collared cam element.

9. The adjustable camshaft of claim 1 wherein the bearing sleeve is comprised of bronze, brass, or plastic.

10. The adjustable camshaft of claim 1 wherein an inner bearing surface of the bearing sleeve has a coating comprising polytetrafluoroethylene.

11. The adjustable camshaft of claim 1 wherein the bearing sleeve is adapted to a width of the at least one collared cam element.

12. An adjustable camshaft comprising:
    an inner shaft and an outer shaft, with the inner shaft being rotatably supported in and concentric with the outer shaft;
    at least one collared cam element with a cam bore rotatably supported on the outer shaft, wherein the at least one collared cam element is rotatably-fixed to the inner shaft, the at least one collared cam element including a cam base body and a cam collar adjacent to the cam base body;
    a bolt for rotatably-fixing the at least one collared cam element to the inner shaft; and
    a bearing sleeve disposed between the at least one collared cam element and the outer shaft, the bearing sleeve being rotatably-fixed to the at least one collared cam element, wherein an inner bearing surface of the bearing sleeve comprises cup-like or groove-like recesses that form a lubricant reservoir.

13. The adjustable camshaft of claim 12 wherein the bearing sleeve is inserted into the cam bore of the at least one collared cam element such that a slide bearing gap is formed between the bearing sleeve and the outer shaft.

14. The adjustable camshaft of claim 13 wherein a second cam is fixed on the outer shaft.

* * * * *